Aug. 13, 1968 S. J. SKIRPAN 3,397,344
LIGHTING CONTROL APPARATUS
Filed Oct. 7, 1965
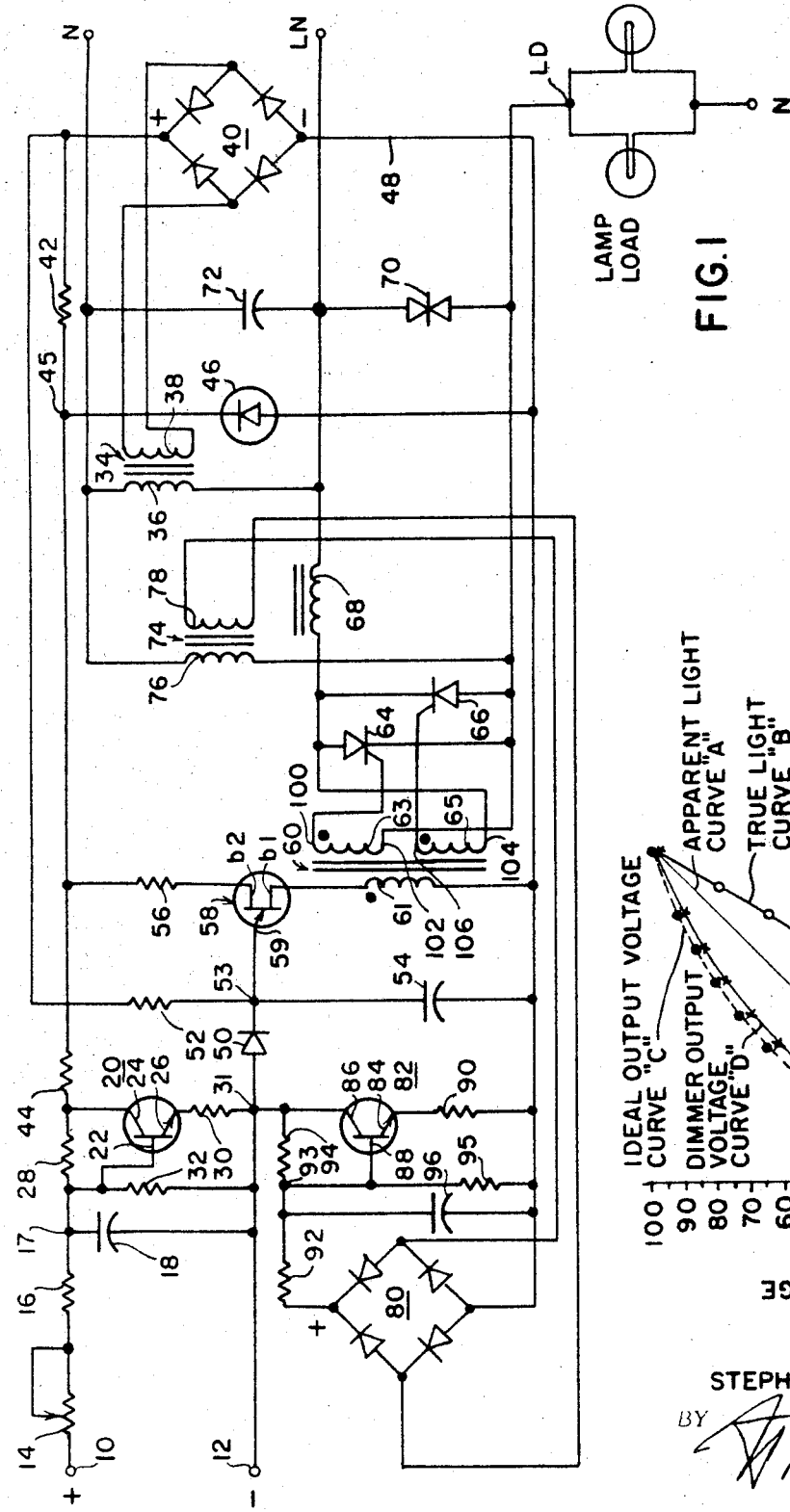
FIG. 1
FIG. 2
INVENTOR.
STEPHEN J. SKIRPAN
BY 
ATTORNEY

United States Patent Office 3,397,344
Patented Aug. 13, 1968

3,397,344
LIGHTING CONTROL APPARATUS
Stephen J. Skirpan, New York, N.Y., assignor to Skirpan Electronics, Inc., Long Island City, N.Y., a corporation of New York
Filed Oct. 7, 1965, Ser. No. 493,793
9 Claims. (Cl. 315—194)

My invention relates to control apparatus. More particularly, it relates to apparatus for finely variably controlling the current supplied to electric lamps to provide a corresponding control of the illumination produced by the lamps.

In my United States Letters Patents Nos. 3,193,725 and 3,193,728, both issued on July 6, 1965, there are disclosed electric lighting control circuits for variably controlling the intensity of the illumination produced by incandescent lamps. In both of these patents, such control is achieved by varying the firing angles of gate controlled rectifiers connected in inverse parallel relationship across the circuit terminals adapted to be connected to a line AC voltage source. The lamps whose intensity is controlled thereby form the circuit load and are series connected between one of the aforesaid terminals and the gate controlled rectifiers. In Patent No. 3,193,725, a suitably biased self-saturating magnetic amplifier is employed to provide gating pulses for the gate controlled rectifiers and in Patent No. 3,193,728, a pulse generator which includes a phase shifting network is used to provide such gating pulses, the varying of the phases of the latter pulses correspondingly varying the firing angles of the gate controlled rectifiers.

While both of the aforesaid circuits described in the respective referred to patents function effectively to enable variable control of incandescent lamp illumination intensity, they both suffer from the disadvantages of being quite complex and expensive and of requiring undesirable amounts of maintenance. Thus the circuit disclosed in Patent No. 3,193,725, for example, requires the use of a relatively expensive magnetic amplifier having a great multiplicity of associated windings to produce variable angle gating pulses for the load current controlling gate controlled rectifiers, a combination of many trimmer resistances which are difficultly retained at their proper desired settings, etc. The circuit disclosed in Patent No. 3,193,728, requires a relatively complex phase shift type pulse generator, a saturable reactor and also includes many variable resistances at given settings to augment its complexity.

It is accordingly, an important object of this invention, to provide an improved remotely operable apparatus for variably controlling the illumination intensity of incandescent lamps which is much simpler, lighter in weight and less expensive to manufacture than known apparatus employed for the same purpose.

It is another object to provide apparatus in accordance with the preceding object which provides square law control characteristics between the control and the light output of the lamps controlled by the apparatus.

It is a further object to provide control apparatus in accordance with the preceding object in which radio frequency interference is substantially minimized.

It is still another object to provide control apparatus in accordance with the preceding objects which is characterized by high efficiency in the minimizing therein of heat losses at high power levels and which is substantially insensitive to change in loading from almost zero to 100 percent of the maximum rated load.

Generally speaking and in accordance with the invention, there is provided apparatus for variably controlling the current from an AC source supplied to an incandescent lamp load comprising a pair of terminals for connecting said apparatus to the source and a pair of gate controlled rectifiers, each of which comprises anode, cathode and gate electrodes connected in their anode to cathode paths in inverse parallel relationship across the terminals. There is included in the apparatus a unijunction transistor relaxation oscillator having emitter and first and second base electrodes, the emitter being adapted to be connected to a variable unidirectional control signal source. Means are provided for deriving a unidirectional signal from the AC source and applying it as an operating biasing potential and for applying the control signal to the emitter to produce a pulse train output from the transistor in which each of the pulses comprising the pulse train respectively occur during discrete half cycles of the AC source output, the times of occurrence of the pulses within the half cycles being determined by the magnitude of the control signal. Means are included for applying the pulses to the gate electrodes to render the rectifiers alternatively conductive in successively occurring half cycles substantially simultaneously with the occurrence of the pulses and for applying the outputs of the rectifiers to the load. There is provided means connected across the load for deriving a unidirectional signal and negatively feeding back this signal to the emitter to provide an AC voltage applied to the load which varies with the control signal to produce a luminescence in the load whose apparent intensity varies linearly with the magnitude of the control signal.

For a better understanding of the invention together with other and further objects thereof, reference is had to the following description taken in conjunction with the accompanying drawing and its scope will be pointed out in the appended claims.

Referring now to FIG. 1 wherein there is shown a schematic diagram of an illustrative embodiment of an electric lighting intensity control circuit constructed in accordance with the principles of the invention, an adjustable relatively low level unidirectional signal from a remote source (not shown) is applied to terminals 10 and 12, the positive and negative input terminals to the circuit respectively. This remote signal is applied through a variable resistor 14 which is utilized to trim the remote input control signal for possible line loss and voltage variation at its source.

The trimmed control signal is then applied through a series connected current limiting resistor 16, the current limited signal being filtered by a parallel connected capacitor 18, such filtering being provided to prevent any phase sensitivity which could be caused by the presence of alternating current components in the control signal.

The filtered control signal is applied as an input to the base electrode 22 of an NPN type transistor 20 which is suitably a silicon transistor. The collector electrode 24 of transistor 20 is connected through a resistor 28 to the junction 17 of resistor 16 and capacitor 18. The emitter electrode 26 of transistor 20 is connected to negative terminal 31 through a resistor 30 and base electrode 22 is connected to junction 17 and to negative terminal 12 through a resistor 32. Resistors 28, 30 and 32 function to provide idealized operating biasing potentials to collector electrode 24, emitter electrode 26 and base electrode 22 respectively. In addition, resistor 32 functions as a bleeder for capacitor 18 and resistor 30 operates to limit the collector to emitter current through transistor 20. It is seen that transistor 20 is connected in an emitter follower common emitter configuration.

The terminals designated with the notations N and LN respectively indicate neutral and line connections adapted to be connected to a conventional line AC source (not shown) such as a 120 v. AC, 60 cycle source. The voltage from the line AC source is applied across the primary winding 36 of a transformer 34, the output of the secondary winding 38 of transformer 34 being applied to the AC input terminals of a full-wave bridge rectifier 40, rectifier 40 preferably comprising silicon diodes. The unidirectional output of rectifier 40 operates to provide a unidirectional current supply, the positive terminal of rectifier 40 being connected to collector 24 through current limiting resistors 42 and 44. A breakdown diode 46, suitably of the Zener type is connected in its cathode to anode path between the junction 45 of resistor 42 and the Zener diode 46 and the negative terminal of rectifier 40 and operates both to regulate the voltage output from rectifier 40 and to shape such output into a rectangular form, resistor 42 limiting the current through breakdown diode 46. Transformer 34 operates to isolate rectifier 40 from the line AC voltage source and thereby prevents interaction between various lighting system control circuits in a lighting system network such as is employed in a theatre, for example.

The conductor 48 from the negative terminal of rectifier 40 may conveniently be referred to as the negative bus. Since transistor 20 and its associated circuit components is connected to operate as an emitter follower, it is seen that with the application of the control signal to transistor 20, junction 31 tends to become more positive with respect to negative bus 48 and to move toward the potential existing at junction 45, such potential being limited by resistors 30 and 44. Such rise in potential is passed through a coupling diode 50 to the junction 53 of a resistor 52 connected between junction 53 and the positive terminal of rectifier 40 and a capacitor 54 connected between junction 53 and negative bus 48, such higher potential commensurately increasing the potential across capacitor 54. As is seen, the series arrangement of resistor 52 and capacitor 54 is directly connected across rectifier 40 to produce across the arrangement, an exponential voltage waveform, actually a ramp voltage whose slope is determined by the values chosen for resistor 52 and capacitor 54 respectively. Since the rectangular wave voltage provided at the cathode of breakdown diode is reproduced at junction 31 at a level as determined by the degree of conductivity of transistor 20, such rectangular wave voltage is coupled to junction 53 from junction 31 through diode 50 where it is added to the ramp voltage, the amplitude of the rectangular wave being controlled by the degree of conductivity of transistor 20 produced in response to the application of the control signal thereto.

Connected between junction 45 and negative bus 48 is the series arrangement of a resistor, the base $b_2$ to base $b_1$ path of a unijunction transistor 58 and the primary winding 61 of a pulse transformer 60. The emitter electrode 59 of unijunction transistor 58 is connected to junction 53. When the voltage at 59 attains the value required to trigger unijunction transistor 58 whereby it is rendered conductive, capacitor 54 discharges therethrough to provide a voltage pulse in primary winding 61 which is transformed to the secondary windings 63 and 65 of transformer 60.

Since transistor 20 operates to control the amplitude of the ramp voltage at junction 53, it is seen that unijunction transistor 58 will be triggered earlier or later as determined by the time at which the ramp voltage attains the required firing level at emitter 59.

A silicon controlled rectifier 64 is connected at its anode to cathode path between the ends 104 and 102 of secondary windings 65 and 63, respectively, and a silicon controlled rectifier 66 is connected in inverse parallel arrangement with silicon controlled rectifier 64, i.e., in its cathode to anode path between the aforesaid ends. The end 100 of secondary winding 63 is connected to the gate electrode of silicon controlled rectifier 64 and the end 106 of secondary winding 65 is connected to the gate electrode of silicon controlled rectifier 66. When a voltage pulse appears in primary winding 61, the polarities at the dot ends of secondary windings 63 and 65 are positive.

The anode of silicon controlled rectifier 64 and the cathode of silicon controlled rectifier 66 is connected to the line source terminal LN through an inductor 68 and the cathode of silicon controlled rectifier 64 and the anode of silicon controlled rectifier 66 are connected to the load terminal LD.

The arrangement of the connections of rectifier 40 and silicon controlled rectifiers 64 and 66 to the line AC source provides synchronization of the occurrence of a gating pulse in either of windings 63 and 65 for silicon controlled rectifiers 64 and 66 and the occurrence of the application of a half cycle of AC line voltage to the silicon controlled rectifiers. Thus silicon controlled rectifiers 64 and 66 can be gated into conductivity at successively occurring half cycles of line AC voltage, the angle of their gating, i.e., the time of their firing in a half cycle depending upon the time of the triggering of unijunction transistor 58 in such half cycle. Resistor 56 operates to stabilize unijunction transistor 58 against temperature variation. Inductor 68 is utilized to provide a series connected reactive impedance to limit current rise time at the time of silicon controlled rectifier gating thereby reducing radio frequency interference, and lamp load filament noise to a minimal negligible amount. When the silicon controlled rectifiers are gated into conductivity they are connected in series arrangement with the lamp load through load terminal LD to effect the application of line voltage to the load, the load being returned to neutral terminal N.

With the arrangement of the circuit of FIG. 1 as so far described, as the triggering time of unijunction transistor 58 is varied, the conduction angles of silicon controlled rectifiers 64 and 66 may be varied through substantially the full 180 degrees of respective half cycles, at least 170 degrees thereof. With such substantially complete control of the silicon controlled rectifier firing angles, the amount of effective power dissipated in the load, i.e., the lamp or lamps and the light intensity of the load is correspondingly commensurately controlled. A double diode 70 connected between terminals LN and LD is suitably an avalanche type diode and operates to protect the silicon controlled rectifiers from the effects of voltage transients. A capacitor 72 connected between the neutral and line terminals N and LN functions to further attenuate radio frequency interference.

The voltage waveform across the lamp load is a sine wave, the conduction angles of the half cycles thereof as determined by the gating times in the half cycles of the silicon controlled rectifiers determining the effective power supplied to the load.

The primary winding 76 of a transformer 74 is connected between the neutral and load terminals N and LD respectively. The secondary winding 78 of transformer 74 is connected to the AC terminals of full-wave bridge rectifier 80 preferably comprising silicon diodes. Transformer 74 is an isolation and step-down transformer for providing a source of negative feed-back voltage, rectifier 80 full-wave rectifying the output therefrom.

A transistor 82 has its emitter electrode 84 connected to negative bus 48 through a resistor 90, a collector electrode 86 connected to junction 31, the positive terminal of rectifier 80 being connected to collector 86 through the series arrangement of resistors 92 and 94. The base electrode 88 of transistor 82 is connected to the junction 93 of resistors 92 and 94, a resistor 95 and a capacitor 96 being connected between junction 93 and negative bus 48. Resistor 92 limits negative feedback current, capacitor 95 operates to remove AC ripple in the feedback current and resistors 90, 94 and 95 provide idealized operating potentials to the electrodes of transistor 82, resistor 95 also functioning as a bleeder for capacitor 96 and resistor 90 limiting the maximum collector to emitter current through transistor 82.

Transistor 82 is connected in the emitter follower configuration similar to transistor 20. As the negative feedback signal from the load is applied to base 88 through transformer 74, rectifier 80 and resistors 92 and 94, junction 31 goes less positive with respect to negative bus 48. Thus, with such arrangement, negative feedback is achieved. It is to be noted that the biasing arrangement for transistor 82 is similar to that for transistor 20. Since conduction in transistor 20 drives the voltage at junction 31 in the positive direction and transistor 82 drives such voltage in the negative direction, the arrangement enables the achieving of excellent stability over a wide temperature range.

The unique combination of resistor 52 and capacitor 54 to produce the ramp voltage at junction 53 and the action of negative feedback transistor 82 results in the transfer characteristics shown in FIG. 2.

Lighting control apparatus

In this figure, the abscissa represents percent of maximum control signal magnitude and the ordinates represent percent of voltage output from the silicon controlled rectifiers applied to the load. In other words, a variable control signal is chosen dependent upon the design characteristics of the circuit to have a maximum value which will cause the unijunction transistor to fire substantially simultaneously with the beginning of a half cycle of AC voltage whereby substantially maximum line voltage is applied to the lamp load through the silicon controlled rectifiers. The abscissa accordingly denotes a ratio expressed in percentage terms of the magnitude of the control signal to the maximum signal and the ordinates denote the ratio in percentage terms of the actual AC line voltage applied to the load to substantially maximum AC line voltage. Since the intensity of luminescence of the lamp load varies directly with the voltage applied thereto, the ordinates of FIG. 2 are properly extrapalable to light output.

In understanding the graphic information depicted in FIG. 2, it is to be realized that by the choice of the time constant of resistor 52, and capacitor 54 plus the negative feedback and the action of transistor 82, to which the negatively fed back signal is applied, curve B in FIG. 2, the true light output curve, indicates that the relationship between the magnitude of the control signal and the light output follows a square law relationship. Such relationship is ideal because it provides a linear relationship between the magnitude of the control signal and the amount of light perceived by the human eye. In this connection, it is to be realized that the human eye does not respond in a linear relationship to change in light intensity but follows approximately a square law curve. Thus, with a true light curve such as curve B which is a square law curve, the apparent light curve A assumes almost an ideal linear form.

To achieve curves A and B, the ideal relationship between the actual percentage of RMS voltage applied to the lamp load and the percentage control signal should take the form shown in curve C. Curve D illustrates the RMS output voltage curve produced with this invention. It is readily apparent that curve D substantially coincides with curve C.

It is to be noted that the negative feedback output provided by transistor 82 in addition to enabling the achieving of curve D in FIG. 2 also enables the providing of excellent output voltage stability practically the whole load range, i.e., from substantially zero to maximum load.

From the foregoing, it is seen that a lamp load control circuit constructed in accordance with the principles of the invention provides a substantially ideal linear apparent light output characteristic employing a simple circuit which comprises inexpensive readily commercially obtainable components and does not require expensive custom made trigger circuits.

While there has been described what is considered to be a preferred embodiment of the invention, it will be obvious to those skilled in the art that other modifications and changes may be made therein without departing from the invention and it is, accordingly, intended in the appended claims to cover all such modifications as fall within the spirit and scope of the invention.

I claim:

1. Apparatus for variably controlling the current from an AC source supplied to an incandescent lamp load comprising a pair of terminals for connecting said apparatus to said source, a pair of gate controlled rectifiers, each of said gate controlled rectifiers respectively comprising anode, cathode, and gate electrodes, connected in their anode to cathode paths in inverse parallel relationship across said terminals, a unijunction transistor relaxation oscillator comprising a transistor having emitter and first and second base electrodes, said emitter being adapted to be connected to a variable unidirectional control signal source, means for deriving a unidirectional voltage from said AC source and applying said last named signal as an operating biasing potential to said transistor, means for applying said control signal to said emitter to produce a pulse train output from said transistor in which each of the pulses comprising said train respectively occur during discrete half cycles of said AC source output, the times of occurrence of said pulses within said half cycles being determined by the magnitude of said control signal, means for applying said pulses to said gate electrodes to render said rectifiers alternately conductive in successively occurring half cycles substantially simultaneously with the occurrence of said pulses, means for applying the outputs of said gate controlled rectifiers to said load and means connected across said load for deriving a unidirectional signal and negatively feeding back said last named signal to said emitter to provide an AC voltage applied to said load which varies with said control signal to produce a luminescence in said load whose apparent intensity varies linearly with the magnitude of said control signal.

2. Apparatus for variably controlling the current from an AC source supplied to an incandescent lamp load comprising a pair of terminals for connecting said apparatus to said source, a pair of gate controlled rectifiers, each of said gate electrodes respectively comprising anode, cathode, and gate electrodes connected in inverse parallel relationship across said terminals, a unijunction transistor relaxation oscillator comprising a transistor having an emitter and first and second base electrodes, said emitter being adapted to be connected to a unidirectional control signal source, an RC time constant arrangement in circuit with said emitter, means for deriving a substantially constant magnitude unidirectional voltage from said AC source and for applying said last named voltage to said time constant arrangement to produce a ramp voltage at said emitter, means for applying said control signal to said emitter to produce a pulse train output from said transistor in which each of the pulses comprising said train respectively occur during discrete half cycles of said AC source output, the times of occurrence of said pulses within said half cycles being determined by the magnitude of said control signal, means for applying said pulses to said gate electrodes to render said rectifiers alternately conductive in successively occurring half cycles substantially simultaneously with the occurrence of said pulses, means for applying the outputs of said gate controlled rectifiers to said load and means connected across said load for deriving a unidirectional signal and negatively feeding back said last named signal to said emitter to provide an AC voltage applied to said load which varies with said control signal to produce a luminescence in said load whose apparent intensity varies substantially linearly with the magnitude of said control signal.

3. Apparatus for variably controlling the current from an AC source supplied to an incandescent lamp load comprising a pair of terminals for connecting said apparatus to said source, a pair of gate controlled rectifiers, each of said gate controlled rectifiers respectively comprising anode, cathode, and gate electrodes, connected in their anode to cathode paths in inverse parallel relationship across said terminals, a unijunction transistor relaxation oscillator comprising a unijunction transistor having an emitter and first and second base electrodes, said emitter being adapted to be connected to a unidirectional control signal source, an RC time constant arrangement in circuit with said emitter, means for deriving a substantially constant magnitude unidirectional voltage from said AC source and for applying said last named voltage to said time constant arrangement to produce a ramp voltage at said emitter, means for applying said control signal to said emitter to produce a pulse train output from said transistor in which each of the pulses comprising said train respectively occur during discrete half cycles of said AC source output, the times of occurrence of said pulses within said half cycles being determined by the magnitude of said control signal, means for applying said pulses to said gate electrodes to render said rectifiers alternately conductive in successively occurring half cycles substantially simultaneously with the occurrence of said pulses, means for applying the outputs of said gate controlled rectifiers to said load, reactance means in circuit with said gate controlled rectifiers for limiting current rise time during the gating of said gate controlled rectifiers, and means connected across said load for deriving a unidirectional signal and negatively feeding back said last named signal to said emitter to provide an AC voltage applied to said load which varies with said control signal to produce a luminescence in said load whose apparent intensity varies substantially linearly with the magnitude of said control signal.

4. Apparatus for variably controlling the current from an AC source supplied to an incandescent lamp load comprising a pair of terminals for connecting said apparatus to said source, a pair of gate controlled rectifiers, each of said gate controlled rectifiers respectively comprising anode, cathode, and gate electrodes, connected in their anode to cathode paths in inverse parallel relationship across said terminals, a unijunction transistor relaxation oscillator comprising a unijunction transistor having an emitter and first and second base electrodes, said emitter being adapted to be connected to a unidirectional control signal source, an RC time constant arrangement in circuit with said emitter, means for deriving a substantially constant magnitude unidirectional voltage from said AC source and for applying said last named voltage to said time constant arrangement to produce a ramp voltage at said emitter, means for applying said control signal to said emitter to produce a pulse train output from said transistor in which each of the pulses comprising said train respectively occur during discrete half cycles of said AC source output, the times of occurrence of said pulses with said half cycles being determined by the magnitude of said control signal, means for applying said pulses to said gate electrodes to render said rectifiers alternately conductive in successively occurring half cycles substantially simultaneously with the occurrence of said pulses, means for applying the outputs of said gate controlled rectifiers to said load, filter means comprising an inductance in series arrangement with said gate controlled rectifiers and a parallel connected capacitance for limiting current rise time during the gating of said gate controlled rectifiers and for minimizing radio frequency interference, an avalanche diode connected across said gate controlled rectifiers for protecting said rectifiers from voltage transients, and means connected across said load for deriving a unidirectional signal and negatively feeding back said last named signal to said emitter to provide an AC voltage applied to said load which varies with said control signal to produce a luminescence in said load whose apparent intensity varies substantially linearly with the magnitude of said control signal.

5. Apparatus as defined in claim 4 and further including a first transistor to which said control signal is applied, the output of said first transistor being applied to said emitter and a second transistor to which said negatively fed back signal is applied, the output of said second transistor being applied to said emitter.

6. Apparatus as defined in claim 5 wherein each of said first and second transistors are connected as emitter followers, each of said transistors comprising emitter, base and collector electrodes, the collector of said transistor being joined to the emitter of said first transistor, the emitter of said unijunction transistor being connected to said junction of said first and second transistors.

7. Apparatus as defined in claim 6 and further including first and second RC filter and bleeder means respectively connected between said control signal source and said first transistor and between said feedback signal source and said second transistor, and a forward poled diode connected between said junction and said emitter of said unijunction transistor.

8. Apparatus as defined in claim 7 wherein said means for deriving said substantially constant magnitude unidirectional voltage comprises a first full wave rectifier in circuit with said AC source for providing a full wave rectifier unidirectional voltage, a breakdown diode connected across transistor oscillator and means for applying the output of said rectifier.

9. Apparatus as defined in claim 8 wherein said means for deriving said feed back signal comprises a transformer connected across said load, a second full-wave rectifier connected between said transformer and said second transistor for the full-wave rectifying the output of said transformer and applying the resulting full-wave rectifier feedback signal to said second transistor.

References Cited

UNITED STATES PATENTS

| | | | |
|---|---|---|---|
| 2,885,598 | 5/1959 | Burski | 315—278 X |
| 3,207,949 | 9/1965 | Rice | 315—196 |

JOHN W. HUCKERT, *Primary Examiner.*

R. F. POLISSACK, *Assistant Examiner.*